US012585533B2

(12) United States Patent
Maghnani et al.

(10) Patent No.: US 12,585,533 B2
(45) Date of Patent: Mar. 24, 2026

(54) SYSTEM AND METHOD FOR DETECTING AND ADDRESSING ANOMALOUS DATA BASED ON AUTOMATED DATA ANALYSIS

(71) Applicant: Bank of America Corporation, Charlotte, NC (US)

(72) Inventors: Vinod Maghnani, Haryrana (IN); Dhuvaraga Prasath B, Tamil Nadu (IN); Imran Khan, Uttar Pradesh (IN); Nandhu Rathi Rajendran, Tamil Nadu (IN); Sivashobika S, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 23 days.

(21) Appl. No.: 18/589,548

(22) Filed: Feb. 28, 2024

(65) Prior Publication Data

US 2025/0272185 A1     Aug. 28, 2025

(51) Int. Cl.
*G06F 11/00* (2006.01)
*G06F 11/07* (2006.01)

(52) U.S. Cl.
CPC ...... *G06F 11/0793* (2013.01); *G06F 11/0766* (2013.01); *G06F 11/079* (2013.01)

(58) Field of Classification Search
CPC . G06F 11/0793; G06F 11/0766; G06F 11/079
USPC ....................................................... 714/1–57
See application file for complete search history.

(56) References Cited

U.S. PATENT DOCUMENTS

| | | | | |
|---|---|---|---|---|
| 7,266,733 B2 * | 9/2007 | Bazinet | ............... | G06F 11/0748 709/224 |
| 7,707,184 B1 | 4/2010 | Zhang et al. | | |
| 8,276,123 B1 * | 9/2012 | Deng | .................... | G06F 11/368 717/124 |
| 8,296,599 B1 * | 10/2012 | Boyer | ................. | G06F 11/2046 714/4.11 |
| 8,972,943 B2 * | 3/2015 | Papakipos | ............. | G06F 9/5027 717/124 |
| 10,153,940 B2 | 12/2018 | Anand et al. | | |
| 10,360,119 B2 | 7/2019 | Jess et al. | | |
| 10,855,548 B2 | 12/2020 | Garvey et al. | | |
| 11,010,255 B2 | 5/2021 | Pan et al. | | |
| 11,087,225 B2 | 8/2021 | Nickl et al. | | |
| 11,099,944 B2 | 8/2021 | Gokhale et al. | | |
| 11,133,953 B2 | 9/2021 | Shive et al. | | |
| 11,227,208 B2 | 1/2022 | Oliner et al. | | |

(Continued)

*Primary Examiner* — Sarai E Butler

(57) ABSTRACT

A system for detecting and addressing anomalous data is disclosed. The system receives a first application data from a source device. The system receives a request to perform an operation on the first application data. In response to receiving the request, the system generates a second application data by performing the operation on the first application data. The operation includes transferring the first application data from a first data format to a second data format. The system determines that a portion of the second application data is anomalous. The system compares the second application data with a historical application data that is associated with a solution instruction. Based on the comparison, the system determines that the second application data corresponds to the historical application data. In response, the system executes the solution instruction to address the anomalous portion of the second application data.

20 Claims, 4 Drawing Sheets

400 —

START

RECEIVE A FIRST APPLICATION DATA — 402

RECEIVE A REQUEST TO PERFORM A FIRST OPERATION ON THE FIRST APPLICATION DATA — 404

GENERATE A SECOND APPLICATION DATA BY PERFORMING THE FIRST OPERATION ON THE FIRST APPLICATION DATA — 406

DETERMINE THAT A PORTION OF THE SECOND APPLICATION DATA IS ANOMALOUS — 408

SELECT A HISTORICAL APPLICATION DATA FROM AMONG A SET OF HISTORICAL APPLICATION DATA, WHERE THE HISTORICAL APPLICATION DATA IS ASSOCIATED WITH A SOLUTION INSTRUCTION — 410

DOES THE SELECTED HISTORICAL APPLICATION DATA CORRESPOND TO THE SECOND APPLICATION DATA? — 412

NO

YES

EXECUTE THE SOLUTION INSTRUCTION TO ADDRESS THE ANOMALOUS PORTION OF THE SECOND APPLICATION DATA — 414

END

(56)     References Cited

U.S. PATENT DOCUMENTS

| | | | | |
|---|---|---|---|---|
| 11,243,521 | B2 | 2/2022 | Cella et al. | |
| 11,436,107 | B2 | 9/2022 | Nadiminti | |
| 11,636,311 | B2 | 4/2023 | Oliner et al. | |
| 2009/0216985 | A1* | 8/2009 | O'Connor | G06F 11/1666 |
| | | | | 711/170 |
| 2009/0327809 | A1* | 12/2009 | Joy | G06F 11/3636 |
| | | | | 714/E11.026 |
| 2012/0166869 | A1* | 6/2012 | Young | G06F 11/079 |
| | | | | 714/15 |
| 2012/0185275 | A1 | 7/2012 | Loghmani | |
| 2015/0019915 | A1* | 1/2015 | Kospiah | G06F 21/566 |
| | | | | 714/38.1 |
| 2015/0295750 | A1* | 10/2015 | Blanco | H04L 67/59 |
| | | | | 714/4.2 |
| 2016/0364279 | A1* | 12/2016 | Brew | G06F 11/3447 |
| 2017/0063897 | A1 | 3/2017 | Muddu et al. | |
| 2017/0075744 | A1* | 3/2017 | Deshpande | H04L 41/0631 |
| 2017/0168911 | A1* | 6/2017 | Otsuka | G06F 11/0748 |
| 2017/0371759 | A1* | 12/2017 | Allaire | G06F 11/3093 |
| 2018/0150742 | A1* | 5/2018 | Woulfe | G06F 11/3608 |
| 2019/0187680 | A1 | 6/2019 | Cella et al. | |
| 2020/0187097 | A1 | 6/2020 | Quan et al. | |
| 2021/0073819 | A1 | 3/2021 | Hernandez et al. | |
| 2021/0209076 | A1* | 7/2021 | Gandi | G06F 11/3452 |
| 2022/0164246 | A1* | 5/2022 | Shen | G06F 11/079 |
| 2023/0067026 | A1 | 3/2023 | Huts et al. | |
| 2025/0036543 | A1* | 1/2025 | Efseaff | G06F 11/3688 |

* cited by examiner

400

SYSTEM AND METHOD FOR DETECTING AND ADDRESSING ANOMALOUS DATA BASED ON AUTOMATED DATA ANALYSIS

TECHNICAL FIELD

The present disclosure relates generally to data transformation, and more specifically to a system and method for detecting and addressing anomalous data based on automated data analysis.

BACKGROUND

Within an organization, different teams may communicate a large volume of data to other teams. The data is often transferred between devices, applications, and networks. At any given stage along the data transfer process, some operations may be performed on the application data. As a result of growing volume of data in data communication and processing, and various operations being performed on the data, some portion of data may become corrupted, lost, or erroneous.

SUMMARY

The system described in the present disclosure is particularly integrated into practical applications of improving the anomaly detection and resolution technology and functioning of computing devices that serve to evaluate application data during a data transfer process. The disclosed system is configured to detect and address missing data, corrupted data, and erroneous data (collectively referred to herein as anomalous data) at every device before, during, and after each operation during a data transfer process by leveraging edge computing. These practical applications and technical advantages driven from them are described further below.

Within an organization, different teams may communicate a large volume of data to other teams. The data is often transferred between devices, applications, and networks. At any given stage along the data transfer process, some operations may be performed on the application data. For example, an application data that is transferred to a computing device may not be compatible with a software application where the application data is going to be processed. As a result, after the application data is processed by the software application may become erroneous or corrupted. In another example, a portion of the application data may be deleted inadvertently by an operator or a software application. Thus, as a result of a growing volume of data in data communication and processing, and various operations being performed on the data, some portion of data may become corrupted, lost, or erroneous.

One approach in anomaly detection systems is the reliance on centralized processing, which may introduce latency and inefficiencies when dealing with large datasets. The centralized approach also provides a greater probability of occurrence of anomalous data due to posing a single point of failure. This reduces the integrity and security of the entire data being transferred. Furthermore, manual user intervention to monitor and check for anomalies in the data being transferred or processed leads to human error, increased response time, and overhead.

Furthermore, if anomalous data is left undetected and continued to be transmitted despite being anomalous, extra processing and memory resources would have to be spent by computing devices that are tasked with anomaly detection to handle the consequences downstream. This scenario poses a problem in terms of reduced resource utilization efficiency within computing devices downstream. When anomalous data is not timely identified and is allowed to propagate through the data transfer process, it imposes additional burdens on computing devices responsible for anomaly detection. For example, computing devices downstream are forced to allocate additional computational resources to manage and process the received anomalous data, which diverts their capacity from handling legitimate and error-free information. This, in turn, introduces a bottleneck and delay in the data transfer process.

Furthermore, if anomalous data is left undetected and continued to be transmitted despite being anomalous, extra processing and memory resources would have to be spent by computing devices that are tasked with anomaly detection to handle the consequences downstream. This scenario poses a problem in terms of reduced resource utilization efficiency within computing devices downstream. When anomalous data is not timely identified and is allowed to propagate through the data transfer process, it imposes additional burdens on computing devices responsible for anomaly detection. For example, computing devices downstream are forced to allocate additional computational resources to manage and process the received anomalous data, which diverts their capacity from handling legitimate and error-free information. This, in turn, introduces a bottleneck and delay in the data transfer process.

The disclosed system provides a technical solution to these and other technical problems. For example, in some embodiments, the disclosed system implements an edge computing anomaly detection and resolution technique in which the application data is evaluated before, during, and after each operation at each device along the data transfer process. Therefore, the disclosed system provides a multi-platform decentralized data anomaly detection and resolution network. Thus, the disclosed system reduces the latency in the anomaly detection and resolution process.

In some embodiments, the disclosed system increases the accuracy of the anomaly detection and resolution process. For example, the disclosed system detects the data pattern of the application data and compares the detected data pattern with a data pattern associated with historical application data that is previously stored in a training dataset and associated with a solution instruction that is known to address the anomalous data. Therefore, by utilizing historical data and vetted and known solution instructions, the probability of addressing the anomalous data is increased. In some examples, the solution instructions may include generating data with a data structure that is compatible with the software application where the data is to be processed.

The disclosed system may implement the data recovery machine learning algorithm to detect the data pattern of the application data and the data pattern of the historical application data. In response, the disclosed system may determine whether the application data includes anomalous data (e.g., unexpected data pattern and/or incompatible data structure). For example, if it is determined that the application data corresponds with the historical application data, and that the data pattern of the application data deviates from or does not correspond to the data pattern of the historical application data, the disclosed system may determine that the application data is associated with an anomalous data pattern. In response, the disclosed system may determine that the application data includes anomalous data and may utilize the solution instruction associated with the historical application data to address the identified anomalous data.

In addition to evaluating the application data in question against the training dataset, the disclosed system may evaluate the application data based on log files which include further information about the anomalous data and error messages as a result of the anomalous data. Based on the further information and error messages determined from the log files, the disclosed system may identify additional solution instructions that have been previously used to address similar error messages and utilize them to address the error message and anomalous data.

In this manner, the disclosed system may address (e.g., remedy or resolve) the anomalous data and error message driven from the anomalous data before the next operation is performed on the application data at any given device during the data transfer process.

In some embodiments, a system for detecting and addressing anomalous data comprises a processor operably coupled with a memory. The memory is configured to store a training dataset comprising historical application data associated with a first solution. The processor is configured to receive a first application data from a source device. The first application data is requested to be transferred from the source device to a target device. The first application data is received in a first data format. The processor is further configured to receive a request to perform a first operation on the first application data. The processor is further configured to generate a second application data by performing a first operation on the first application data in response to receiving the request, where the first operation comprises transforming the first application data from the first data format to a second data format. The processor is further configured to determine that a portion of the second application data is anomalous. In some embodiments, determining that the portion of the second application data is anomalous comprises comparing the first application data with the second application data, and based at least in part upon the comparison, determining that the portion of the second application data is missing or corrupted. The processor is further configured to compare the second application data with the historical application data. The processor is further configured to determine that the second application data corresponds to the historical application data based at least in part upon the comparison. The processor is further configured to execute the first solution to address the anomalous portion of the second application data in response to determining that the second application data corresponds to the historical application data.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to detect and address anomalous data. Embodiments of the present disclosure and its advantages may be understood by referring to FIGS. 1 through 4. FIGS. 1 through 4 are used to describe systems and methods to detect and address anomalous data, according to some embodiments.

System Overview

Figure 1:
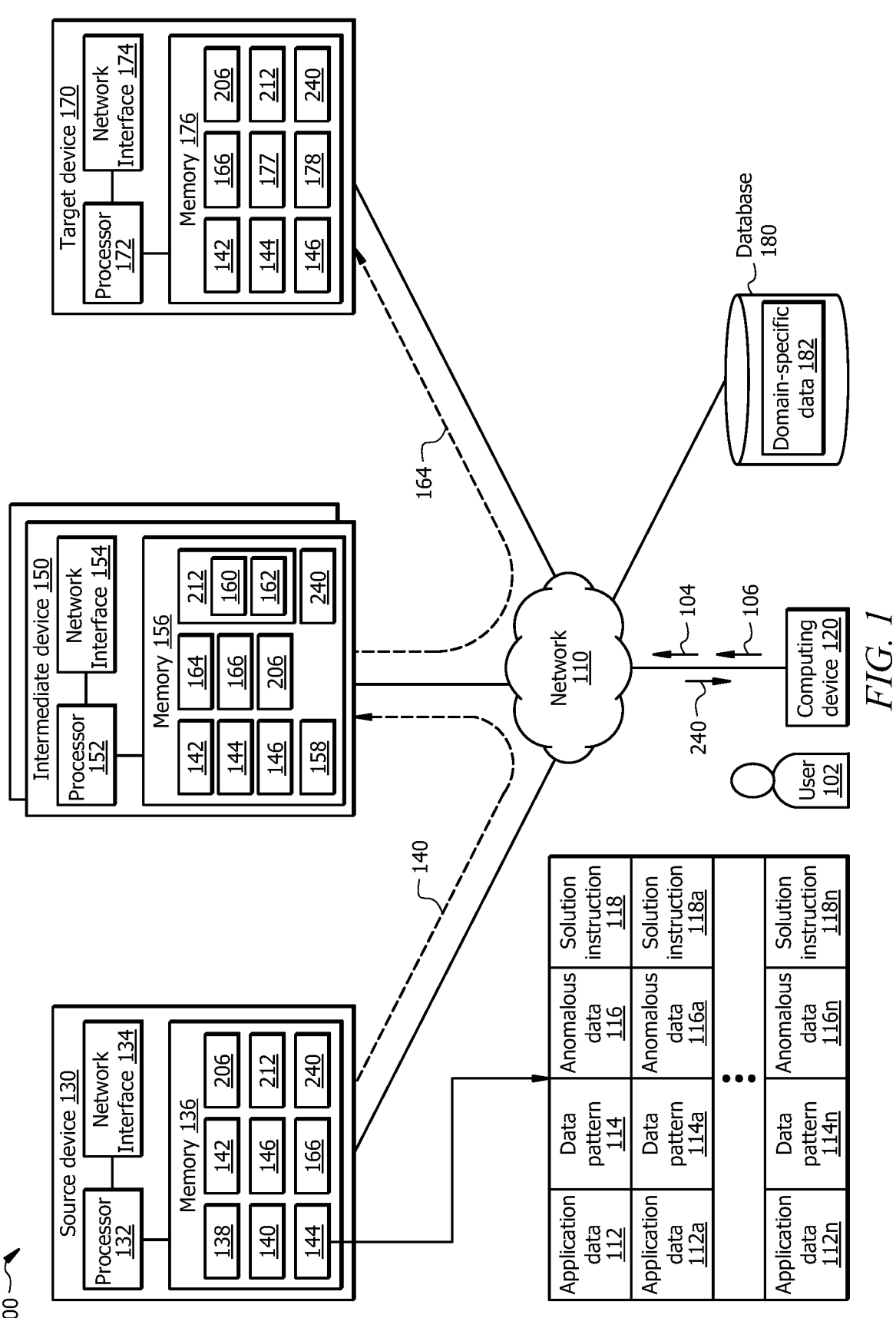
FIG. 1 illustrates an embodiment of a system configured to detect and address anomalous data.

FIG. 1 illustrates an embodiment of a system 100 that is generally configured to detect and address missing data, corrupted data, and erroneous data (collectively referred to herein as anomalous data) at every device before, during, and after each operation during a data transfer process, according to some embodiment of the present disclosure. In some embodiments, the system 100 comprises a computing device 120, a source device 130, one or more intermediate devices 150, a target device 170, and a database 180, communicatively coupled to each other via a network 110. The network 110 enables the communication among the components of the system 100. A user 102 may use the computing device 120 to communicate a data transfer request 104 to the source device 130 so that application data 140 is communicated from the source device 130 to the target device 170 via one or more intermediate devices 150.

The source device 130 may receive the source application data 140 and evaluate the source application data 140 to determine whether it includes any anomalous data. After evaluation and determining that the source application data 140 does not include any anomalous data or the system addresses the anomalous data, the source application data 140 is sent to the intermediate device 150. The intermediate device 150 evaluates the received application data to determine whether it includes any anomalous data. The intermediate device 150 may perform one or more operations on the source application data 140, e.g., provision operation 160 and transformation operation 162. At each operation, the intermediate device 150 evaluates the application data and generates the intermediate application data 164. In response to determining that the intermediate application data 164 does not include anomalous data or the system addresses the anomalous data, it is sent to the target device 170. The target device 170 performs similar operations, evaluates the received application data upon arrival and at every operation, and generates the target data 178. The database 180 may include information that may be used by any of the devices 130, 150, 170 in the data anomaly detection and resolution process.

In this manner, the system 100 provides a comprehensive anomaly detection and resolution throughout the entire data transfer process. The system 100 leverages edge computing in each of the devices 130, 150, and 170 to reduce the latency in anomaly detection and resolution process at each device.

In general, the system 100 improves the anomaly detection and resolution technology and the functioning of computing devices that serve to evaluate the application data during the data transfer process. The system 100 provides technical advantages and improvements such as, evaluating application data before, during, and after each operation at each device, which reduces the latency in anomaly detection, replaces the detected anomalous data with a corresponding correct application data, and facilitates that correct application data is processed and transferred to a next device along the network transfer path of the application data.

Within an organization, different teams may communicate a large volume of data to other teams. The data is often transferred between devices, applications, and networks. At any given stage along the data transfer process, some operations may be performed on the application data. For example, an application data that is transferred to a computing device may not be compatible with a software application where the application data is going to be processed. As a result, after the application data is processed by the software application may become erroneous or corrupted. In another example, a portion of the application data may be deleted inadvertently by an operator or a software application. Thus, as a result of a growing volume of data in data communication and processing, and various operations being performed on the data, some portion of data may become corrupted, lost, or erroneous.

One approach in anomaly detection systems is the reliance on centralized processing, which may introduce latency and inefficiencies when dealing with large datasets. The centralized approach also provides a greater probability of occurrence of anomalous data due to posing a single point of failure. This reduces the integrity and security of the entire data being transferred. Furthermore, manual user intervention to monitor and check for anomalies in the data being transferred or processed leads to human error, increased response time, and overhead.

Furthermore, if anomalous data is left undetected and continued to be transmitted despite being anomalous, extra processing and memory resources would have to be spent by computing devices that are tasked with anomaly detection to handle the consequences downstream. This scenario poses a problem in terms of reduced resource utilization efficiency within computing devices downstream. When anomalous data is not timely identified and is allowed to propagate through the data transfer process, it imposes additional burdens on computing devices responsible for anomaly detection. For example, computing devices downstream are forced to physically allocate additional computational resources to manage and process the received anomalous data, which divert their capacity from handling legitimate and error-free information. This, in turn, introduces a bottleneck and delay in data transfer process.

The system 100 provides a technical solution to these and other technical problems. For example, in some embodiments, the system 100 implements edge computing anomaly detection and resolution technique in which the application data 140, 164, 178 is evaluated before, during, and after each operation (e.g., operations 160 and 162) at each device 130, 150, and 170 along the data transfer process. Therefore, the system 100 provides a multi-platform decentralized data anomaly detection and resolution network. Thus, the system 100 reduces the latency in the anomaly detection and resolution process.

In some embodiments, the system 100 increases the accuracy of the anomaly detection and resolution process. For example, the system 100 detects the data pattern of the application data 140, 164, 178 and compares the detected data pattern with a data pattern 114 associated with historical application data 112 that is previously stored in a training dataset 144 and associated with a solution instruction 118 that addresses the anomalous data 116. Therefore, by utilizing historical data and vetted and known solution instructions, the probability of addressing the anomalous data is increased. In some examples, the solution instructions 118 may include generating at least the portion of the application data 140, 164, 178 that is determined to be anomalous with a data structure that is compatible with the software applications 166 where the application data 140, 164, 178 is to be processed.

The system 100 may implement the data recovery machine learning algorithm 142 to detect the data pattern of the application data 140, 164, 178, and the data pattern 114 of the historical application data 112. In response, the system 100 may determine whether the application data 140, 164, 178 includes an anomalous data (e.g., unexpected data pattern and/or incompatible data structure). For example, if it is determined that the application data 140, 164, 178 corresponds with the historical application data 112a, and that the data pattern of the application data deviates from or does not correspond to the data pattern 114a of the historical application data 112a, the system 100 may determine that the application data 140, 164, 178 is associated with an anomalous data pattern. In response, the system 100 may determine that the application data 140, 164, 178 includes anomalous data and may utilize the solution instruction 118a to address the identified anomalous data. In some examples, the solution instructions 118a may include generating at least the portion of the application data 140, 164, 178 that is determined to be anomalous with a data structure that is compatible with the software application 166 where application data 140, 164, 178 is to be processed.

In addition to evaluating the application data 140, 164, 178 in question against the training dataset 144, the system 100 may evaluate the application data 140, 164, 178 based on log files 206 which include further information about the anomalous data and error messages as a result of the anomalous data. Based on the further information and error messages determined from the log files 206, the system 100 may identify additional solution instructions (e.g., solution instructions 234 of FIG. 2) that have been previously used to address similar error messages and utilize them to address the error message and anomalous data.

In this manner, the system 100 may address (e.g., remedy or resolve) the anomalous data and error message driven from the anomalous data before a next operation (e.g., operation 212 of FIG. 2) is performed on the application data 140, 164, 178 at any given device 130, 150, 170.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Example Computing Device

Computing device 120 may be generally any device that is configured to process data and interact with users 102. Examples of the computing device 120 include but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The computing device 120 may include a user interface, such as a display, a microphone, a camera, a keypad, or other appropriate terminal equipment usable by user 102. The computing device 120 may include a hardware processor, memory, and/or circuitry configured to perform any of the functions or actions of the computing device 120 described herein.

The computing device 120 may include a hardware processor, memory, and/or circuitry (not explicitly shown) configured to perform any of the functions or actions of the computing device 120 described herein. For example, the computing device 120 includes a processor in signal communication with a network interface and a memory. The memory of the computing device 120 stores software instructions that when executed by the processor of the computing device 120 cause the processor of the computing device 120 to perform one or more operations of the computing device 120 described herein. For example, a software application designed using software code may be stored in the memory of the computing device 120 and executed by the processor of the computing device 120 to perform the functions of the computing device 120. The computing device 120 is configured to communicate with other devices and components of the system 100 via the network 110.

The user 102 may use the computing device 120 to send the data transfer request 104 to the source device 130. In response, in some examples, the source application data 140 may be sent to the source device 130 from the computing device 120. In other examples, the source application data 140 may be generated by the source device 130.

Source Device

Source device 130 may include one or more hardware computer systems, such as virtual machines. For example, the source device 130 may be implemented by a plurality of computing devices using distributed computing and/or cloud computing systems in a network. The source device 130 may be one of the devices along the network path of the application data 140 that is requested to be sent from the source device 130 to the target device 170.

In some examples, the source device 130 may receive the source application data 140. In some examples, the source application data 140 may be generated by the source device 130 in response to a request from the user 102. The source device 130 may analyze the source application data 140 via automated data analysis engine 146 and data recovery machine learning algorithm 142 to determine whether source application data 140 includes anomalous data and if it is determined that it includes anomalous data, address the anomalous data. These operations are described in greater detail in FIG. 2.

In certain embodiments, the source device 130 may be configured to provide services and resources (e.g., data and/or hardware resources) to the components of the system 100. For example, the source device 130 may communicate the source application data 140 to the intermediate device 150 after addressing any anomalous data detected in the application data 140.

The source device 130 comprises a processor 132 operably coupled with a network interface 134 and a memory 136. Processor 132 comprises one or more processors operably coupled to the memory 136. The processor 132 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). For example, one or more processors may be implemented in cloud devices, servers, virtual machines, and the like. The processor 132 may be a programmable logic device, a microcontroller, a microprocessor, or any suitable number and combination of the preceding. The one or more processors are configured to process data and may be implemented in hardware or software. For example, the processor 132 may be 8-bit, 16-bit, 32-bit, 64-bit, or of any other suitable architecture. The processor 132 may include an arithmetic logic unit (ALU) for performing arithmetic and logic operations. The processor 132 may register the supply operands to the ALU and stores the results of ALU operations. The processor 132 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 138) to perform the operations of the source device 130 described herein. In this way, processor 132 may be a special-purpose computer designed to implement the functions disclosed herein. In an embodiment, the processor 132 is implemented using logic units, FPGAs, ASICs, DSPs, or any other suitable hardware. The processor 132 is configured to operate as described in FIGS. 1-4. For example, the processor 132 may be configured to perform one or more operations of the operational flow 200 described in FIGS. 2 and 3, and one or more operations of the method 400 as described in FIG. 4.

Network interface 134 is configured to enable wired and/or wireless communications. The network interface 134 may be configured to communicate data between the source device 130 and other devices, systems, or domains of the system 100. For example, the network interface 134 may comprise a near field communication (NFC) interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 132 may be configured to send and receive data using the network interface 134. The network interface 134 may be configured to use any suitable type of communication protocol.

The memory 136 may be a non-transitory computer-readable medium. The memory 136 may be volatile or non-volatile and may comprise read-only memory (ROM), random-access memory (RAM), ternary content-addressable memory (TCAM), dynamic random-access memory (DRAM), and static random-access memory (SRAM). The memory 136 may include one or more of a local database, cloud database, network-attached storage (NAS), etc. The memory 136 comprises one or more disks, tape drives, or solid-state drives, and may be used as an over-flow data storage device, to store programs when such programs are selected for execution, and to store instructions and data that are read during program execution. The memory 136 may store any of the information described in FIGS. 1-4 along with any other data, instructions, logic, rules, or code operable to implement the function(s) described herein when executed by processor 132. For example, the memory 136 may store software instructions 138, source application data 140, data recovery machine learning algorithm 142, log files 206, automated data analysis engine 146, training dataset 144, software application 166, operations 212, results 240, and/or any other data or instructions. The software instructions 138 may comprise any suitable set of instructions, logic, rules, or code operable to execute the processor 132 and perform the functions described herein, such as some or all of those described in FIGS. 1-4.

The automated data analysis engine 146 may be implemented by the processor 132, 152, 172 executing the software instructions 138, 158, 177, respectively, and is generally configured to automatically analyze the application data (e.g., source application data 140, intermediate application data 164, target data 178) to detect information associated with the application data, including whether there is any error messages in the log files 206 associated with the application data, data channels used for the application data, data criticality level, and software applications 166 in which the application data is used. These operations are described in greater detail in FIG. 2. When the automated data analysis engine 146 is implemented by the processor 132 by executing the software instructions 138, it evaluates the source application data 140 before, during, and after each operation 212. When the automated data analysis engine 146 is implemented by the processor 152 executing the software instructions 158, it evaluates the intermediate application data 164 before, during, and after each operation 212. When the automated data analysis engine 146 is implemented by the processor 172 executing the software instructions 177, it evaluates the target application data 178 before, during, and after each operation 212. Each operation 212 may be implemented by the processor 132, 152, 172 executing the software instructions 138, 158, 177, respectively.

The data recovery machine learning algorithm 142 may be implemented by the processor 132, 152, 172 executing the software instructions 138 158, 178, respectively, and is generally configured to detect the data pattern (e.g., data format 218) associated with the application data (e.g., source application data 140, intermediate application data 164, target data 178), and determine whether the detected data pattern is anomalous by comparing the detected data pattern with data pattern 114 of each of the historical application data 112 in the training dataset 144. The data recovery machine learning algorithm 142 may comprise support vector machine, neural network, random forest, k-means clustering, etc. The data recovery machine learning algorithm 142 may be implemented by a plurality of neural network (NN) layers, convolutional NN (CNN) layers, Long-Short-Term-Memory (LSTM) layers, Bi-directional LSTM layers, recurrent NN (RNN) layers, and the like. In some examples, the data recovery machine learning algorithm 142 may be implemented by natural language processing (NLP), data processing, text recognition, generative text processing, etc. The data recovery machine learning algorithm 142 may be implemented by unsupervised, semi-supervised, and/or supervised learning.

When the data recovery machine learning algorithm 142 is implemented by the processor 132 by executing the software instructions 138, it evaluates the source application data 140 before, during, and after each operation 212. When the data recovery machine learning algorithm 142 is implemented by the processor 152 by executing the software instructions 158, it evaluates the intermediate application data 164 before, during, and after each operation 212. When the data recovery machine learning algorithm 142 is implemented by the processor 172 by executing the software instructions 177, it evaluates the target application data 178 before, during, and after each operation 212.

For example, the data recovery machine learning algorithm 142 may compare the source application data 140 with each of the historical application data 112. In response to determining that the source application data 140 corresponds to the historical application data 112a, data recovery machine learning algorithm 142 may compare the data pattern of the source application data 140 with the data pattern 114a of the historical application data 112a. If the data recovery machine learning algorithm 142 determines that the data pattern of the source application data 140 does not correspond to the data pattern 114a of the historical application data 112a, the data recovery machine learning algorithm 142 may determine that the source application data 140 includes anomalous data (e.g., the source application data 140 is associated with the anomalous data 116a). In response, the data recovery machine learning algorithm 142 may utilize the solution instruction 118a previously used to address the anomalous data 116a. These operations are described in greater detail in FIG. 2.

The training dataset 144 may include a set of historical application data 112, including the historical application data 112a-n associated with the data pattern 114a-n, anomalous data 116a-n, and solution instruction 118a-n, respectively. Each historical application data 112 may be an application data that has been previously evaluated in a respective historical data transfer process.

In some embodiments, the solution instructions 118a may include an instruction to physically allocate particular computational (e.g., processing and memory) resources to perform one or more particular operations 212 (e.g., data transformation operation 162, data provision operation 160) on the anomalous portion of the application data (e.g., source application data 140, intermediate application data 164, target data 178), an instruction to physically allocate a particular amount of network resources to a transfer or reception of the application data (e.g., source application data 140, intermediate application data 164, target data 178) from or at a device (e.g., source device 130, intermediate device 150, target device 170), an instruction to update a configuration file associated with the application data (e.g., source application data 140, intermediate application data 164, target data 178), an instruction to deploy a first software update to the application data (e.g., source application data 140, intermediate application data 164, target data 178), an instruction to generating at least the portion of the application data 140, 164, 178 that is determined to be anomalous with a data structure that is compatible with the software applications 166 where the application data 214 is to be processed (e.g., an instruction to transform the anomalous data 215 portion of the application data 214 to data with a desired data structure that is compatible with the software applications 166), and/or an instruction to deploy a second software update to one or more operations (e.g., data transformation, data provision).

In some embodiments, each of the data patterns (e.g., data format 218) of the application data (e.g., source application data 140, intermediate application data 164, target data 178) and data patterns 114 of a historical application data 112 may include data format, data schema, data structure, and the like. For example, each of the data patterns (e.g., data formats 216, 218) and the data patterns 114 may include a structured list of information in an excel sheet, a nested structure with key-value pairs, (e.g., JSON), arrays, Boolean pattern (e.g., yes or no, true or false, etc.), geographical pattern (e.g., location coordinates in latitude and longitude form), phone number pattern, profile number pattern, email address pattern, linked lists, stacks, queues, trees, graphs, hash tables, and heaps, among others.

In some embodiments, the anomalous data 116 may indicate the issue with respect to the historical application data 112, such as an error, whether data is missing, corrupted, or is incorrect (inconsistent data format/pattern/structure), whether the data is corrupted as a result of a bug in code executed on the historical application data 112, whether historical application data 112 is corrupted as a result of insufficient memory, processing, and/or network resources, error in configuration file associated with the historical application data 112, inconsistent data structure, among others.

Intermediate Device

Intermediate device 150 may include one or more hardware computer systems, such as virtual machines. For example, the intermediate device 150 may be implemented by a plurality of computing devices using distributed computing and/or cloud computing systems in a network. The intermediate device 150 may be one of the devices along the network path of the application data that is requested to be sent from the source device 130 to the target device 170. In some examples, the intermediate device 150 may receive the source application data 140 from the source device 130 and use it to generate the intermediate application data 164 by performing one or more operations 212 on the source application data 140, such as provision operation 160, and/or transformation operation 162, among others.

The intermediate device 150 may analyze the source application data 140 via automated data analysis engine 146 and data recovery machine learning algorithm 142 to determine whether the source application data 140 includes anomalous data and if it is determined that it includes anomalous data, address the anomalous data. These operations are described in greater detail in FIG. 2.

In certain embodiments, the source device 130 may be configured to provide services and resources (e.g., data and/or hardware resources) to the components of the system 100. For example, the source device 130 may communicate the intermediate application data 164 to the target device 170 after it is determined that the intermediate application data 164 does not include any anomalous data or addressing the anomalous data.

The intermediate device 150 comprises a processor 152 operably coupled with a network interface 154 and a memory 156. Processor 152 comprises one or more processors operably coupled to the memory 156. The processor 152 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 152 may be a programmable logic device, a microcontroller, a microprocessor, or any suitable number and combination of the preceding. The one or more processors are configured to process data and may be implemented in hardware or software. For example, the processor 152 may be 8-bit, 16-bit, 32-bit, 64-bit, or of any other suitable architecture. The processor 152 may include an ALU for performing arithmetic and logic operations. The processor 152 may register the supply operands to the ALU and stores the results of ALU operations. The processor 152 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 158) to perform the operations of the intermediate device 150 described herein. In this way, processor 152 may be a special-purpose computer designed to implement the functions disclosed herein. In an embodiment, the processor 152 is implemented using logic units, FPGAs, ASICs, DSPs, or any other suitable hardware. The processor 152 is configured to operate as described in FIGS. 1-4. For example, the processor 152 may be configured to perform one or more operations of the operational flow 200 described in FIGS. 2 and 3, and one or more operations of the method 400 as described in FIG. 4.

Network interface 154 is configured to enable wired and/or wireless communications. The network interface 154 may be configured to communicate data between the intermediate device 150 and other devices, systems, or domains of the system 100. For example, the network interface 154 may comprise an NFC interface, a Bluetooth interface, a Zigbee interface, a Z-wave interface, an RFID interface, a WIFI interface, a LAN interface, a WAN interface, a MAN interface, a PAN interface, a WPAN interface, a modem, a switch, and/or a router. The processor 152 may be configured to send and receive data using the network interface 154. The network interface 154 may be configured to use any suitable type of communication protocol.

The memory 156 may be a non-transitory computer-readable medium. The memory 156 may be volatile or non-volatile and may comprise ROM, RAM, TCAM, DRAM, and SRAM. The memory 156 may include one or more of a local database, cloud database, NAS, etc. The memory 156 comprises one or more disks, tape drives, or solid-state drives, and may be used as an over-flow data storage device, to store programs when such programs are selected for execution, and to store instructions and data that are read during program execution. The memory 156 may store any of the information described in FIGS. 1-4 along with any other data, instructions, logic, rules, or code operable to implement the function(s) described herein when executed by processor 152. For example, the memory 156 may store software instructions 158, operations 212, data recovery machine learning algorithm 142, software application 166, intermediate application data 164, log files 206, and training dataset 144, automated data analysis engine 146, results 240, and/or any other data or instructions. The software instructions 158 may comprise any suitable set of instructions, logic, rules, or code operable to execute the processor 152 and perform the functions described herein, such as some or all of those described in FIGS. 1-4. The automated data analysis engine 146 and data recovery machine learning algorithm 142 are described above.

The operations 212 may include data provision operation 160 and data transformation operation 162. The data provision operation 160 may include any operation for preparing and organizing the received application data (e.g., source application data 140, intermediate application data 164, target data 178). Some examples of data provision operation 160 may include data cleaning (e.g., adapting the length of the different portions of the data to be the same as other portions if they are meant to have the same length), normalizing the data, aggregating the data, rectifying minor inconsistencies among different portions of the received application data. In some examples, data provision operation 160 may include receiving the application data via application programming interface (API) calls, and formatting the received data according to a desired predefined format. In some examples, the data provision operation 160 may include data filtering to extract a particular portion of the received data that is desired to be analyzed and processed.

Some examples of data transformation operation 162 may include transforming the application data (e.g., source application data 140, intermediate application data 164, target data 178) from one data format (e.g., xls, cvs, array, etc.) to another data format (e.g., json, xml, etc.) in order to process the application data in the desired predefined format. In some examples, the received application data may be in a data format that is not compatible with the software application 166 which is designated to handle and process the application data. Thus, the received application data is transformed into a data format that is compatible with the software applications 166. Therefore, the received application data is reconstructed to be consumed and processed by the software applications 166.

The software applications 166 may be performed by the processor 132, 152, 172 executing the software instructions 138, 158, 177, respectively. The software applications 166 may be used to perform different operations on the application data. For example, software applications 166 may include text processing applications, such as natural language processing applications, database applications, such as my structured query language (MySQL), data mining, data visualization, and the like.

Target Device

Target device 170 may include one or more hardware computer systems, such as virtual machines. For example, the target device 170 may be implemented by a plurality of computing devices using distributed computing and/or cloud computing systems in a network. The target device 170 may be one of the devices along the network path of the application data that is requested to be sent from the source device 130 to the target device 170.

In some examples, the target device 170 may receive the intermediate application data 164 from the intermediate device 150 and use it to generate the target application data 178 by performing one or more operations 212 on the source application data 140, such as data provision, data transformation, among others. The target device 170 may analyze the received intermediate application data 164 via automated data analysis engine 146 and data recovery machine learning algorithm 142 to determine whether the received intermediate application data 164 includes anomalous data and if it is determined that it includes anomalous data, address the anomalous data. These operations are described in greater detail in FIG. 2.

The target device 170 comprises a processor 172 operably coupled with a network interface 174 and a memory 176. Processor 172 comprises one or more processors operably coupled to the memory 176. The processor 172 is any electronic circuitry, including, but not limited to, state machines, one or more CPU chips, logic units, cores (e.g., a multi-core processor), FPGAs, ASICS, or DSPs. For example, one or more processors may be implemented in cloud devices, servers, virtual machines, and the like. The processor 172 may be a programmable logic device, a microcontroller, a microprocessor, or any suitable number and combination of the preceding. The one or more processors are configured to process data and may be implemented in hardware or software. For example, the processor 172 may be 8-bit, 16-bit, 32-bit, 64-bit, or of any other suitable architecture. The processor 172 may include an ALU for performing arithmetic and logic operations. The processor 172 may register the supply operands to the ALU and store the results of ALU operations. The processor 172 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 177) to perform the operations of the target device 170 described herein. In this way, processor 172 may be a special-purpose computer designed to implement the functions disclosed herein. In an embodiment, the processor 172 is implemented using logic units, FPGAs, ASICs, DSPs, or any other suitable hardware. The processor 172 is configured to operate as described in FIGS. 1-4. For example, the processor 172 may be configured to perform one or more operations of the operational flow 200 described in FIGS. 2 and 3, and one or more operations of the method 400 as described in FIG. 4.

Network interface 174 is configured to enable wired and/or wireless communications. The network interface 174 may be configured to communicate data between the target device 170 and other devices, systems, or domains of the system 100. For example, the network interface 174 may comprise an NFC interface, a Bluetooth interface, a Zigbee interface, a Z-wave interface, an RFID interface, a WIFI interface, a LAN interface, a WAN interface, a MAN interface, a PAN interface, a WPAN interface, a modem, a switch, and/or a router. The processor 172 may be configured to send and receive data using the network interface 174. The network interface 174 may be configured to use any suitable type of communication protocol.

The memory 176 may be a non-transitory computer-readable medium. The memory 176 may be volatile or non-volatile and may comprise ROM, RAM, TCAM, DRAM, and SRAM. The memory 176 may include one or more of a local database, cloud database, NAS, etc. The memory 176 comprises one or more disks, tape drives, or solid-state drives, and may be used as an over-flow data storage device, to store programs when such programs are selected for execution, and to store instructions and data that are read during program execution. The memory 176 may store any of the information described in FIGS. 1-4 along with any other data, instructions, logic, rules, or code operable to implement the function(s) described herein when executed by processor 172. For example, the memory 176 may store software instructions 177, data recovery machine learning algorithm 142, target application data 178, log files 206, training dataset 144, operations 212, software applications 166, automated data analysis engine 146, results 240, and/or any other data or instructions. The software instructions 177 may comprise any suitable set of instructions, logic, rules, or code operable to execute the processor 172 and perform the functions described herein, such as some or all of those described in FIGS. 1-4.

The automated data analysis engine 146 and data recovery machine learning algorithm 142 are described above.

Database

The database 180 may be any storage capacity structure that is configured to store data and communicate with other devices. Examples of the database 180, include, but are not limited to, a network-attached storage cloud, a storage area network, a storage assembly directly (or indirectly) coupled to one or more components of the system 100. The database 180 stores domain-specific data 182 that include a set of categories of domain-specific keywords, where each category of domain-specific keywords includes a set of keywords associated with a respective domain. Some examples of categories may include frontend web development, backed web development, customer management system, accounting, law field, etc.

When the application data that is requested to be transferred from the source device 130 to the target device 170, the system 100 may determine the domain associated with the application data, e.g., based on an indication from the user 102 included in the request 106 and/or data pattern recognition by the software instructions 138 at the source device 130. In response, the domain-specific data 182 that includes a set of keywords that is related to the domain of the application data is used by the devices 130, 150, and 170 of the system 100 to analyze and evaluate the application data.

In some embodiments, the domain-specific data 182 may further include comments and messages from authorities in the domain field to which the application data is associated. In some embodiments, the domain-specific data 182 may further include a set of predefined rules that includes a mapping between each error message (222 in FIG. 2) and one or more alternative solution instruction (234 in FIG. 2).

Operational Flow for Detecting and Addressing Anomalous Data

Figure 2:
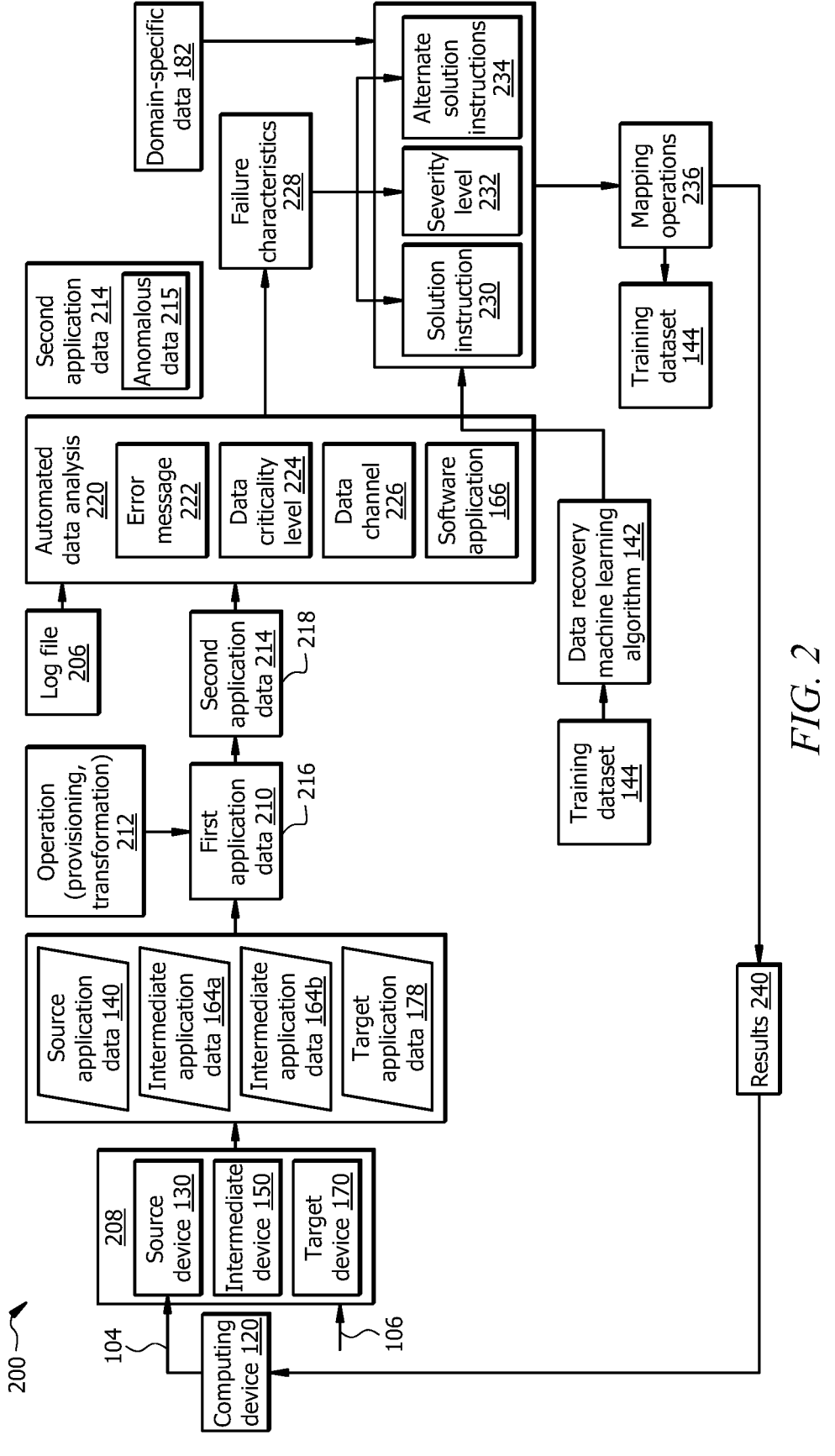
FIGS. 2 and 3 illustrate an example operational flow of the system of FIG. 1.
Figure 3:
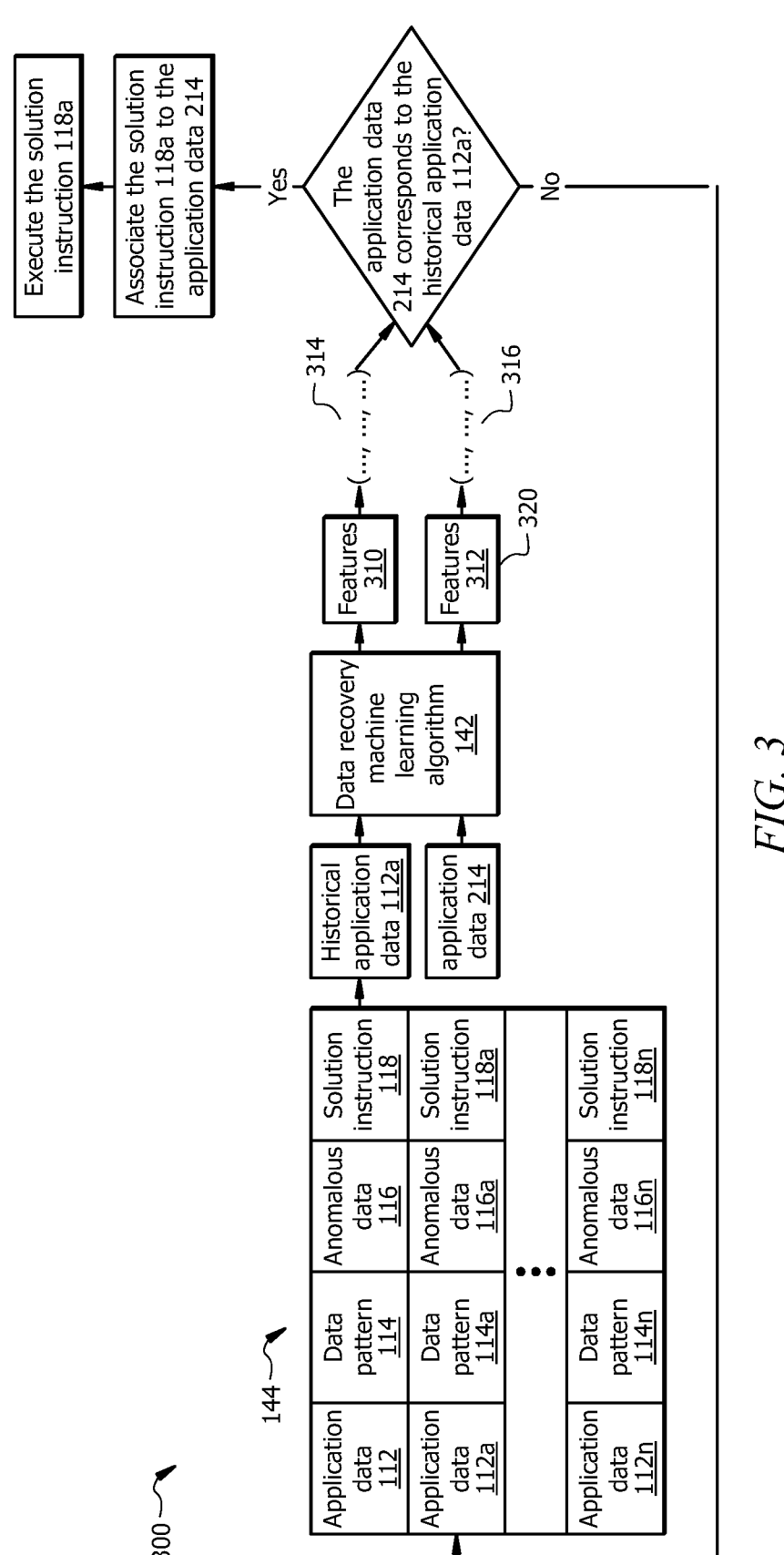

FIGS. 2 and 3 illustrate an example operational flow 200 of system 100 of FIG. 1 for detecting and addressing anomalous data in the application data (e.g., source application data 140, intermediate application data 164a and 164b, and target application data 178). Referring to FIG. 2, the operational flow 200 may begin when the user sends the data transfer request 104 from the computing device 120 to the source device 130. For example, the data transfer request 104 may include information about the network path that the application data 140 is to be transferred through, the application data 140, among other information.

As described in FIG. 1, the application data 140 may include any type of data, such as a list of customer information, information about web development, accounting, etc. To generalize the terminology and to indicate that the anomaly detection and resolution process of the system 100 of FIG. 1 may be performed by any device in the data transfer process and before, during, and after each operation 212, source device 130, intermediate device 150, and target device 170 may be referred to as a device 208, and the source application data 140, intermediate application data 164a, 164b, and target application data 178 may be referred to as examples of the application data 210, 214.

For example, the source application data 140 may be the application data evaluated at the source device 130, the intermediate application data 164a may be evaluated at the intermediate device 150 and may be the application data after the intermediate data provisioning operation 160 is performed on the intermediate application data 164a, the intermediate application data 164b may be evaluated at the intermediate device 150 and may be the application data after the data transformation operation 162 is performed on the intermediate application data 164b, and the target application data 178 may be the application data evaluated at the target device 170.

In the example of FIG. 2, assume that the device 208 receives the first application data 210. In some cases, the device 208 may be the intermediate device 150 that receives the first application data 210 from the source device 120. The first application data 210 may have a first data format 216. The first data format 216 may be in xls, array, structured key-value pairs, nested key-value pairs, json, csv, or other data formats. In some embodiments, upon receiving the first application data 210, the device 208 may evaluate the first application data 210 via the automated data analysis engine

146 and the data recovery machine learning algorithm 142, similar to that described in FIG. 1.

The device 208 may perform an operation 212 on the first application data 210, such as data provision operation 160, data transformation operation 162, and the like. In some embodiments, the device 208 may perform the operation 212 on the first application data 210 in response to receiving a request 106 from the user 102. In some embodiments, the device 208 may perform the operation 212 on the first application data 210 in response to determining that the operation 212 is indicated in the request 104 and/or request 106. The device 208 may perform the operation 212 on the first application data 210 to generate the second application data 214. In a particular example, the intermediate device 150 may perform the data transformation operation 162 on the first application data 210 (e.g., source application data 140) after performing the data provisioning operation 160 on the received application data 210 (e.g., source application data 140), similar to that described in FIG. 1. In response, the intermediate device 150 may generate the second application data 214 (e.g., intermediate application data 164b).

Performing the Automated Data Analysis on the Application Data

The device 208 may perform the automated data analysis 220 on the second application data 214 by executing the automated data analysis engine 146. In this process, the device 208 may parse the application data 214 to extract information from the application data 214. For example, the device 208 may determine whether an error message 222 is associated with the application data 214, determine data criticality level 224 is associated with the application data 214, determine data channel 226, and determine software applications 166.

Regarding the identification of the error message 222, the device 208 may access the log file 206 associated with application data 210, 214. For example, the log file 206 may include information about the operation 212. The device 208 may access the log file 206 that is associated with operation 212 and includes information about the status of the application data 210 and 214 when the operation 212 is being performed on the first application data 210 and the application data 214 is being generated. The device 208 may parse the log files 206 by text parsing algorithms, or any other suitable method. If the log file 206 includes an error messages 222, the device 208 may identify the error message 222.

Regarding the identification of the data criticality level 224, the device 208 may determine the scope of effect that the error message 222 and the application data 214 have downstream and/or on affected entities, such as devices, departments, users, people, organizations, etc. In some embodiments, the criticality level 224 may be proportional to the number of people or entities affected by the error message 222 and the application data 214. For example, if it is determined that the more than a threshold number of entities are affected by the error message 222 and the application data 214, the device 208 may determine that the criticality level 224 of the application data 214 is high (e.g., more than 7 out of 10). In some embodiments, the criticality level 224 may be based on the type of data/information included in the application data 214. For example, if the application data 214 includes sensitive/confidential data, the criticality level 224 may be more than a threshold (e.g., more than 7 out of 10).

The device 208 may determine the urgency in handling the error message 222. In some embodiments, the criticality level 224 may be proportional to urgency in time for addressing the error message 222 and the application data 214. For example, if it is determined that as the result of the error message 222, there is immediate effect on downstream and/or on affected entities, the device 208 may determine that the criticality level 224 of the application data 214 is high (e.g., more than 7 out of 10). In another example, if it is determined that the error message 222 may be addressed in more than a threshold time period (e.g., after two days, three days, etc.) and it is not urgent, low criticality level 224 (e.g., less than 4 out of 10) may be assigned to the error message 222 and the application data 214.

In some embodiments, the device 208 may use a weighted combination of the number of affected entities by the error message 222 and the application data 214, and the urgency in addressing the error message 222 and the application data 214. For example, the device 208 may assign a first weight value to the number of affected entities and a second weigh value to the urgency factor, where the first and second weight values may be determined by the automated analysis engine 146, neural network of data recovery machine learning algorithm 142, and/or other machine learning algorithms.

Regarding the identification of the data channel 226, the device 208 may determine through which channels the application data 214 is sent, received, and processed. Examples of the data channels 226 include links, application programming interfaces, webhooks, web sockets, etc. Regarding the identification of the software applications, 166, the device 208 may identify the software applications 166 that is used to generate the application data 214 based on the identifier of the software applications 166 included in the log files 206, for example.

Determining the Failure Characteristics of the Application Data

In some embodiments, based on the automated data analysis 220, the device 208 may determine whether a portion of the application data 214 is anomalous, i.e., includes anomalous data 215. For example, in some embodiments, the device 208 may determine that the application data 214 includes anomalous data 215 in response to comparing the application data 214 with the application data 210 and based on the comparison, determine that a portion of the application data 214 is missing, corrupted, or erroneous. For example, if the application data 210 includes a particular data that is missing from the application data 214, it may be determined that the application data 214 is missing that portion of the data. In another example, if a portion of the application data 214 is not consistent with the counterpart portion of the application data 210, the device 208 may determine that the portion of the application data 214 is erroneous or corrupted. In another example, the device 208 may identify a portion of the application data 214 that is corrupted or erroneous based on the error message 222 and determine that the error message 222 is with respect to the portion of the application data 214.

In some embodiments, the device 208 may evaluate the application data 214 with respect to the historical application data 112 included in the training dataset 144, similar to that described in FIG. 1. In response to determining that the application data 214 includes anomalous data 215, the device 208 may determine the failure characteristics 228 of the anomalous portion of the application data 214. The failure characteristics 228 may indicate the context of the failure, such as a root cause (or reason) of the error message 222. In some cases, there may be no error messages 222, and the failure characteristics 228 may indicate the cause of the anomalous data 215. For example, the device 208 may access the log files 206 to identify the error message 222 and further information that may indicate the reason for the error message 222. In some embodiments, the device 208 may determine the failure characteristics 228 of the anomalous portion of the application data 214 based on evaluating the application data 214 compared with the historical data 112 in the training dataset 144.

In some examples, the root cause of the error message 222 and/or anomalous data may include insufficient computational resources (e.g., processing and/or memory resources) physically being allocated to the operation 212 being performed on the application data 210, insufficient network resources physically being allocated to a transfer of application data 210, a configuration file associated with the application data 210 being incompatible with the operation 212, the data channel 226 is associated with network anomaly (e.g., network congestion, etc.), software applications 166 is outdated, the application data 210 is associated with outdated code, inconsistent data structure, among others.

The device 208 may identify a historical application data 112a that corresponds to the application data 214 and determine that the historical application data 112a includes the anomalous data 116a that corresponds to the anomalous data 215. In response, the device 208 may determine that the failure characteristic 228 of the anomalous portion of the application data 214 may correspond to the root cause of the anomalous data 116a in the historical application data 112a, as indicated in information associated with the anomalous data 116a.

Evaluating the Application Data with a Training Dataset

The device 208 may feed the determined information, including the application data 210, 214, the failure characteristics 228, error message 222, data criticality level 224, data channels 226, and software applications 166 to the data recovery machine learning algorithm 142. The data recovery machine learning algorithm 142 may evaluate the received information to determine a solution instruction 230, severity level 232, and alternative solution instructions 234 to address the anomalous data 215 in the application data 214. This process is described in conjunction with FIG. 3.

FIG. 3 illustrates the process of evaluating the application data 214 against the training dataset 144. In this process, the data recovery machine learning algorithm 142 may compare the application data 214 with each of the historical application data 112. For example, with respect to the historical application data 112a, the data recovery machine learning algorithm 142 may compare the application data 214 with the historical application data 112a. To this end, the data recovery machine learning algorithm 142 may extract a first set of features 310 from the historical application data 112a, where the features 310 indicate a first data pattern 318a, anomalous data 116a, solution instructions 118a associated with the historical application data 112a. The features 310 may further indicate characteristics, data structure, and attributes of the historical application data 112a, the task that the historical application data 112a was used for, data channels 226 used to transmit the historical application data 112a, error messages 222 associated with the historical application data 112a, criticality level 224 of the historical application data 112a, software applications 166 in which the historical application data 112a was used, among others. The features 310 may be represented by the feature vector 314 that comprises a set of numerical values.

In a similar manner, the data recovery machine learning algorithm 142 may extract a second set of features 312 from the application data 214, where the features 312 may indicate a second data pattern 320 associated with the application data 214. The data pattern 320 may indicate a data format 218 and other attributes of the application data 214. The features 312 may further indicate characteristics, data structure, and attributes of the application data 214, the task that the application data 214 was used for, data channels 226 used to transmit the application data 214, error messages 222 associated with the application data 214, criticality level 224 of the application data 214, software applications 166 in which the application data 214 was used, among others. The features 312 may be represented by the feature vector 316 that comprises a set of numerical values.

The data recovery machine learning algorithm 142 may compare the feature vector 314 with the feature vector 316. In this process, the data recovery machine learning algorithm 142 may perform a vector comparison operation, such as cosine similarity, Euclidean distance, or other mathematical measures, to quantify the similarity or dissimilarity between the two feature vectors 314 and 316. This comparison assesses the alignment of characteristics, data structures, and attributes between the historical application data 112a and the application data 214.

The data recovery machine learning algorithm 142 may determine whether the feature vector 314 corresponds to the feature vector 316. For example, the Euclidean distance may quantify the straight-line distance between two points in a space. In the context of feature vectors 314 and 316, a smaller Euclidean distance suggests greater similarity, while a larger distance implies dissimilarity. If the data recovery machine learning algorithm 142 determines that the Euclidean distance between the feature vectors 314 and 316 is small (e.g., less than a threshold distance, such as 0.1 centimeter (cm), 0.2 cm, etc.), it may determine that the feature vectors 314 is similar to the feature vector 316 (e.g., the feature vector 314 corresponds to the feature vector 316). In response, the data recovery machine learning algorithm 142 may determine that the data pattern 318 and other attributes associated with the application data 214 corresponds to the data pattern 114a and attributes associated with the historical application data 112a, respectively.

In some embodiments, in comparing the feature vectors 314 and 316 with each other, the data recovery machine learning algorithm 142 may compare each numerical value of the feature vector 314 with a counterpart numerical value of the feature vector 316. The data recovery machine learning algorithm 142 may determine that the feature vector 314 corresponds to the feature vector 316 if it is determined that the more than a threshold number (e.g., more than 90%, 85%, etc.) of the numerical values of feature vector 314 correspond to (or are within a threshold range (e.g., within 2%, 3%, etc.) of the counterpart numerical values of the feature vector 316.

Further in response, the data recovery machine learning algorithm 142 may determine that the historical application data 112a corresponds to the application data 214 and, in response, determine that the solution instruction 118a may be used to address the anomalous data 215 of the application data 214.

Determining a Solution to Address the Detected Anomaly

Referring back to FIG. 2, upon determining that historical application data 112a corresponds to the application data 214 and, in response, determining that the solution instruction 118a may be used to address the anomalous data 215 of the application data 214, the data recovery machine learning algorithm 142 may include the solution instructions 118a to the solution instructions 230 to possibly be used to address the anomalous data 215. In some embodiments, the data recovery machine learning algorithm 142 may select one of the solution instructions 230 and alternate solution instructions 234 based on the severity level 232, error message 222, data channel 226, and/or software applications 166 to be executed to address the anomalous data 215.

In some examples, the data recovery machine learning algorithm 142 may select to execute a solution instruction 230, 234 in less than a threshold time after the anomalous data 215 is detected if it is determined that the severity level 232 is more than a threshold level (e.g., more than 7 out 10). In an example, the data recovery machine learning algorithm 142 may select a solution instruction 230, 234 to physically allocate particular computational resources to perform (or re-execute) the data transformation operation 212 on the anomalous portion of the application data 214 (e.g., intermediate application data 164, when the anomalous portion is detected in the application data 214 (e.g., intermediate application data 164) during the data transformation operation 212, and the root cause of the anomaly is determined to be insufficient computational resources being allocated to the operation 212 according to the automated data analysis 220 and failure characteristics 228.

In some examples, the data recovery machine learning algorithm 142 may select a solution instruction 230, 234 to update the configuration file associated with the application data 210 and/or 214 if it is determined that the anomalous data 215 is due to outdated configuration or misconfiguration in the application data 210 and/or 214 according to the automated data analysis 220 and failure characteristics 228.

In some examples, the data recovery machine learning algorithm 142 may select a solution instruction 230, 234 to deploy a software update to the application data 210 and/or 214 if it determined that the anomalous data 215 is due to outdated software code associated with the application data 210 and/or 214.

In some examples, the data recovery machine learning algorithm 142 may select a solution instruction 230, 234 to deploy a software update to the software application 166 if it is determined that the anomalous data 215 is due to the outdated code in the software applications 166 where the anomalous data 215 is encountered.

In some examples, the data recovery machine learning algorithm 142 may select a solution instruction 230, 234 to physically allocate a particular network resources to the data transfer process in transmitting and/or receiving the anomalous data 215 if it is determined that the anomalous data 215 is due to insufficient network resources for application data 210 and/or 214 according to the automated data analysis 220, data channel 226, and failure characteristics 228.

In some embodiments, the data recovery machine learning algorithm 142 may assign a severity level 232 to the application data 214. In the process of assigning the severity level 232, the data recovery machine learning algorithm 142 may assign the severity level 232 based on the determined criticality level 224. For example, if the criticality level 224 is high (e.g., 7 out of 10), the severity level 232 may be high (e.g., 7 out of 10). In some embodiments, the severity level 232 may be proportional or correspond to the criticality level 224.

In some examples, the data recovery machine learning algorithm 142 may select a solution instruction 230, 234 to generate at least the portion of the application data 214, 210 that is determined to be anomalous with a data structure that is compatible with the software application 166 where the application data 214, 210 is to be processed (e.g., an instruction to transform the anomalous data 215 portion of the application data 214 to data with a desired data structure that is compatible with the software application 166).

In some embodiments, the data recovery machine learning algorithm 142 may determine one or more alternate solution instructions 234 to address the anomalous data 215. In some embodiments, the alternative solution instructions 234 may include instructions that are predefined and associated with a set of predefined rules and includes a mapping between each error message 222 and one or more alternative solution instruction 234. In some embodiments, the alternative solution instructions 234 may be determined based on domain-specific data 182 that may include the set of predefined rules.

Upon determining the solution instructions 230, severity level 232, and alternate solution instruction 234, in the mapping operation 236, the data recovery machine learning algorithm 142 may map, link, or associated each of these to the failure characteristics 228, application data 214, anomalous data 215, data pattern (e.g., data format 218) of the application data 214. In response, these associations may be populated to the training dataset 144. This population may be used for validating other application data 210, 214 in other data transfer processes.

In response to determining that the application data 214 corresponds to the historical application data 112*a*, in some embodiments, the data recovery machine learning algorithm 142 may select and execute one or more instructions from the solution instructions 230 and the alternate solution instructions 234 according to the automated data analysis 220, failure characteristics 228, etc., similar to the examples and embodiments described above.

In some embodiments, the data recovery machine learning algorithm 142 may include one or more selected instructions 230, 234 to the user 102 to the result 240 and communicate the result 240 in a message to the computing device 120. In such embodiments, the user 102 may confirm, update, or override the selection of the data recovery machine learning algorithm 142. In response, the data recovery machine learning algorithm 142 may execute the selected and confirmed instruction 230, 234.

In some embodiments, addressing the anomalous data 215 may include executing the selected solution instruction 230, 234. In some embodiments, addressing the anomalous data 215 may include replacing the anomalous data 215 with counterpart correct data. For example, the data recovery machine learning algorithm 142 may replace the anomalous data 215 with counterpart correct data from the historical application data 112*a*. In some examples, the data recovery machine learning algorithm 142 may generate the corresponding correct data with respect to the anomalous data 215 based on the identified counterpart correct data from the historical application data 112*a* and replace the anomalous data 215 with the generated correct data. Thus, the data recovery machine learning algorithm 142 may perform data restoration and recovery.

Example Method for Detecting and Addressing Anomalous Data

Figure 4:
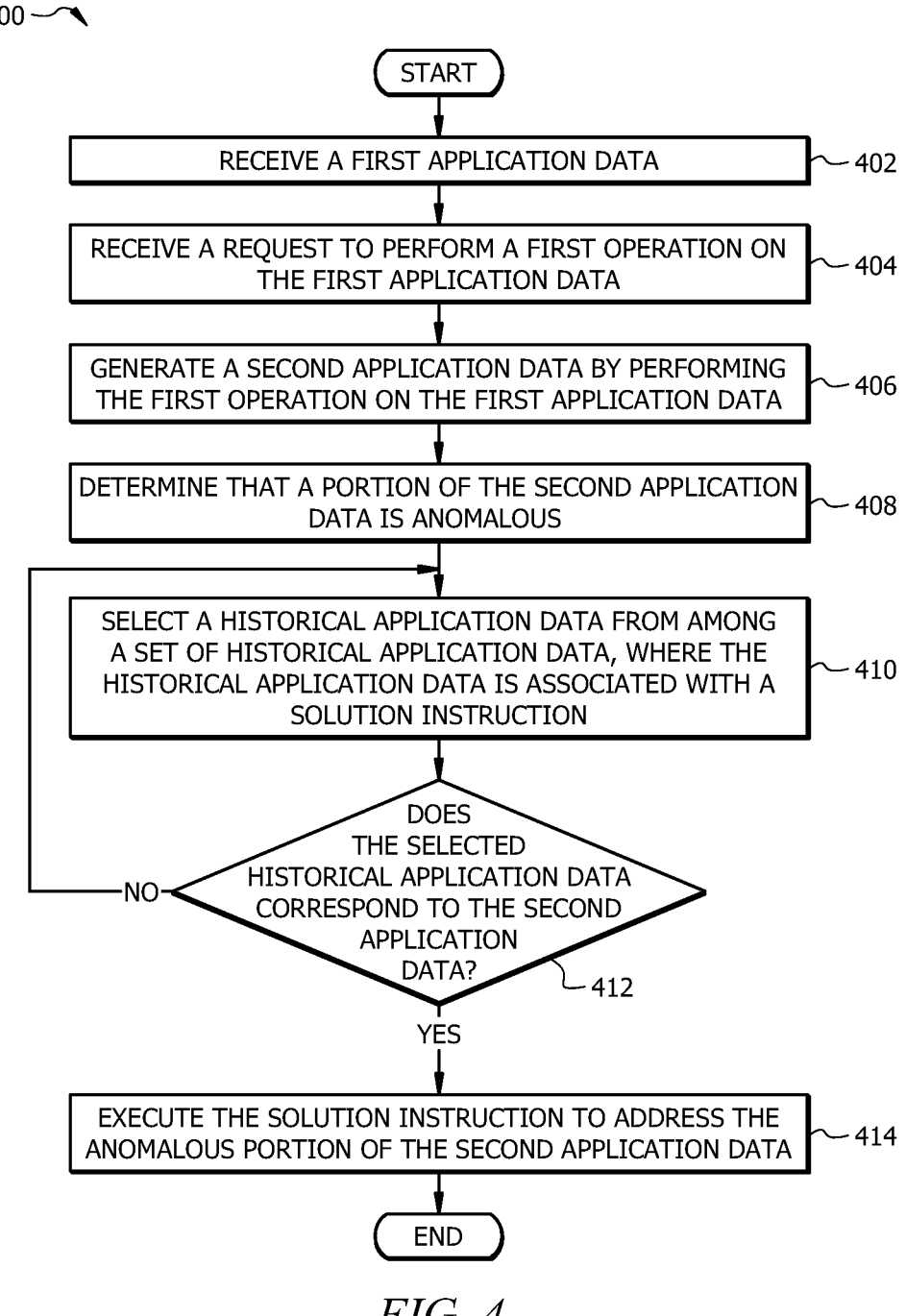
FIG. 4 illustrates an example flowchart of a method to detect and address anomalous data.

FIG. 4 illustrates an example flowchart of a method 400 for detecting and addressing anomalous data 215, according to some embodiments. Modifications, additions, or omissions may be made to method 400. Method 400 may include more, fewer, or other operations. For example, operations may be performed in parallel or in any suitable order. While at times it is discussed that the system 100, computing devices 120, device 208 (e.g., source device 130, intermediate device 150, and target device 170), or components of any of thereof perform some operations, any suitable system or components of the system may perform one or more operations of the method 400. For example, one or more operations of method 400 may be implemented, at least in part, in the form of software instructions 138, 158, and 177 of FIG. 1, stored on a tangible non-transitory machine-readable medium (e.g., memory 136, 156, and 176 of FIG. 1) that when run by one or more processors (e.g., processor 132, 152, and 172 of FIG. 1) may cause the one or more processors to perform operations 402-414.

At operation 402, the device 208 receives a first application data 210, similar to that described in FIG. 2. At operation 404, the device 208 receives a request 104 to perform a first operation 212 on the first application data 214. For example, the device 208 may perform data provisioning or data transformation operation 212 on the first application data 214, similar to that described in FIG. 2.

At operation 406, the device 208 generates second application data 214 by performing the first operation 212 on the first application data 214, similar to that described in FIG. 2. At operation 408, the device 208 determines that a portion of the second application data 214 is anomalous. For example, the device 208 may perform the automated data analysis 220 on the second application data 214 to evaluate the second application data 214 and determine that the second application data 214 includes an anomalous data 215, similar to that described in FIG. 2.

At operation 410, the device 208 selects a historical application data 112*a-n* from among the set of historical application data 112*a-n*, e.g., included in the training dataset 144, where the historical application data 112*a-n* is associated with a solution instruction 118*a-n*.

At operation 412, the device 208 determines whether the selected historical application data 112 corresponds to the second application data 214, similar to that described in FIGS. 2 and 3. If it is determined that the selected historical application data 112 corresponds to the second application data 214, method 400 may proceed to operation 414. Otherwise, the method 400 may return to operation 410.

At operation 414, the device 208 may execute a solution instruction 230 to address the anomalous portion of the second application data 214, similar to that described in FIG. 2. In some embodiments, the device 208 may select and execute one or more of the solution instructions 230 and 234, similar to that described in FIG. 2.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for detecting and addressing anomalous data, comprising:

a memory configured to store a training dataset comprising historical application data associated with a first solution instruction; and a processor, operably coupled to the memory, and configured to:

receive a first application data from a source device, wherein:

the first application data is requested to be transferred from the source device to a target device; and the first application data is received in a first data format;

receive a request to perform a first operation on the first application data, wherein as a part of processing the first application data, the first operation is to be performed on the first application data, and a second operation is intended to be performed on the first application data at the target device;

in response to receiving the request, generate a second application data by performing the first operation on the first application data, wherein the first operation comprises transforming the first application data from the first data format to a second data format;

determine that a portion of the second application data is anomalous, wherein determining that the portion of the second application data is anomalous comprises:

comparing the first application data with the second application data; and based at least in part upon the comparison, determining that the portion of the second application data is incompatible with a software application designated to perform the second operation on the first application data at the target device;

compare the second application data with the historical application data;

based at least in part upon the comparison, determine that the second application data corresponds to the historical application data; and in response to determining that the second application data corresponds to the historical application data, execute the first solution instruction to address the anomalous portion of the second application data, wherein in response to the first solution instruction being executed on the anomalous portion of the second application data, the anomalous portion of the second application is transformed into another data format that is compatible with the software application.

2. The system of claim 1, wherein the first solution instruction comprises at least one of:

an instruction to allocate particular computational resources to perform the first operation on the anomalous portion of the second application data;

an instruction to allocate particular network resources to a transfer of the first application data from the source data;

an instruction to update a configuration file associated with the first application data;

an instruction to deploy a first software update to the first application data;

an instruction to generate data corresponding to the anomalous portion of the second application, where the generated data is associated with a data structure that is compatible with a software application; or an instruction to deploy a second software update to the first operation.

3. The system of claim 1, wherein determining that the second application data corresponds to the historical application data is in response to:

extracting a first set of features from the historical application data, wherein the first set of features indicates a first data pattern associated with the historical application data, wherein the first set of features is represented by a first feature vector;

extracting a second set of features from the second application data, wherein the second set of features indicates a second data pattern associated with the second application data, wherein the second set of features is represented by a second feature vector;

comparing each numerical value of the first feature vector with a counterpart numerical value of the second feature vector; and determining that at least a threshold number of numerical values of the first feature vector correspond to counterpart numerical values of the second feature vector.

4. The system of claim 1, wherein the processor is further configured to:

determine a set of failure characteristics associated with the anomalous portion of the second application data, wherein determining the set of failure characteristics comprises:

accessing a log file associated with the first operation being performed on the first application data; and identifying an error message in the log file; and based at least in part upon the set of failure characteristics, determine a root cause of the anomalous portion of the second application data.

5. The system of claim 4, wherein the root cause of the anomalous portion of the second application data comprises at least one of:

insufficient computational resources being allocated to the first operation being performed on the first application data;

insufficient network resources being allocated to a transfer of first application data from the source device; or a configuration file associated with the first application data being incompatible with the first operation.

6. The system of claim 5, wherein the set of failure characteristics comprises at least one of the root cause, a criticality level of the anomalous portion of the second application data, or a software application in which the second application data is used.

7. The system of claim 6, wherein the criticality level of the anomalous portion of the second application data is determined based at least in part upon at least one of a number of people affected by the anomalous portion and a type of data comprised in the second application data.

8. A method for detecting and addressing anomalous data, comprising:

storing a training dataset comprising historical application data associated with a first solution instruction;

receiving a first application data from a source device, wherein:

the first application data is requested to be transferred from the source device to a target device; and the first application data is received in a first data format;

receiving a request to perform a first operation on the first application data, wherein as a part of processing the first application data, the first operation is to be performed on the first application data, and a second operation is intended to be performed on the first application data at the target device;

in response to receiving the request, generating a second application data by performing the first operation on the first application data, wherein the first operation comprises transforming the first application data from the first data format to a second data format;

determining that a portion of the second application data is anomalous, wherein determining that the portion of the second application data is anomalous comprises:

comparing the first application data with the second application data; and based at least in part upon the comparison, determining that the portion of the second application data is incompatible with a software application designated to perform the second operation on the first application data at the target device;

comparing the second application data with the historical application data;

based at least in part upon the comparison, determine that the second application data corresponds to the historical application data; and in response to determining that the second application data corresponds to the historical application data, executing the first solution instruction to address the anomalous portion of the second application data, wherein in response to the first solution instruction being executed on the anomalous portion of the second application data, the anomalous portion of the second application is transformed into another data format that is compatible with the software application.

9. The method of claim 8, wherein the first solution instruction comprises at least one of:

an instruction to allocate particular computational resources to perform the first operation on the anomalous portion of the second application data;

an instruction to allocate particular network resources to a transfer of the first application data from the source data;

an instruction to update a configuration file associated with the first application data;

an instruction to deploy a first software update to the first application data;

an instruction to generate data corresponding to the anomalous portion of the second application, where the generated data is associated with a data structure that is compatible with a software application; or an instruction to deploy a second software update to the first operation.

10. The method of claim 8, wherein determining that the second application data corresponds to the historical application data is in response to:

extracting a first set of features from the historical application data, wherein the first set of features indicates a first data pattern associated with the historical application data, wherein the first set of features is represented by a first feature vector;

extracting a second set of features from the second application data, wherein the second set of features indicates a second data pattern associated with the second application data, wherein the second set of features is represented by a second feature vector;

comparing each numerical value of the first feature vector with a counterpart numerical value of the second feature vector; and determining that at least a threshold number of numerical values of the first feature vector correspond to counterpart numerical values of the second feature vector.

11. The method of claim 8, further comprising:

determining a set of failure characteristics associated with the anomalous portion of the second application data, wherein determining the set of failure characteristics comprises:

accessing a log file associated with the first operation being performed on the first application data; and identifying an error message in the log file; and based at least in part upon the set of failure characteristics, determining a root cause of the anomalous portion of the second application data.

12. The method of claim 11, wherein the root cause of the anomalous portion of the second application data comprises at least one of:

insufficient computational resources being allocated to the first operation being performed on the first application data;

insufficient network resources being allocated to a transfer of first application data from the source device; or a configuration file associated with the first application data being incompatible with the first operation.

13. The method of claim 12, wherein the set of failure characteristics comprises at least one of the root cause, a criticality level of the anomalous portion of the second application data, or a software application in which the second application data is used.

14. The method of claim 13, wherein the criticality level of the anomalous portion of the second application data is determined based at least in part upon at least one of a number of people affected by the anomalous portion and a type of data comprised in the second application data.

15. A non-transitory computer-readable medium storing instructions that when executed by a processor, cause the processor to:

store a training dataset comprising historical application data associated with a first solution instruction;

receive a first application data from a source device, wherein:

the first application data is requested to be transferred from the source device to a target device; and the first application data is received in a first data format;

receive a request to perform a first operation on the first application data, wherein as a part of processing the first application data, the first operation is to be performed on the first application data, and a second operation is intended to be performed on the first application data at the target device;

in response to receiving the request, generate a second application data by performing the first operation on the first application data, wherein the first operation comprises transforming the first application data from the first data format to a second data format;

determine that a portion of the second application data is anomalous, wherein determining that the portion of the second application data is anomalous comprises:

comparing the first application data with the second application data; and based at least in part upon the comparison, determining that the portion of the second application data is incompatible with a software application designated to perform the second operation on the first application data at the target device;

compare the second application data with the historical application data;

based at least in part upon the comparison, determine that the second application data corresponds to the historical application data; and in response to determining that the second application data corresponds to the historical application data, execute the first solution instruction to address the anomalous portion of the second application data, wherein in response to the first solution instruction being executed on the anomalous portion of the second application data, the anomalous portion of the second application is transformed into another data format that is compatible with the software application.

16. The non-transitory computer-readable medium of claim 15, wherein the first solution instruction comprises at least one of:

an instruction to allocate particular computational resources to perform the first operation on the anomalous portion of the second application data;

an instruction to allocate particular network resources to a transfer of the first application data from the source data;

an instruction to update a configuration file associated with the first application data;

an instruction to deploy a first software update to the first application data;

an instruction to generate data corresponding to the anomalous portion of the second application, where the generated data is associated with a data structure that is compatible with a software application; or an instruction to deploy a second software update to the first operation.

17. The non-transitory computer-readable medium of claim 15, wherein determining that the second application data corresponds to the historical application data is in response to:

extracting a first set of features from the historical application data, wherein the first set of features indicates a first data pattern associated with the historical application data, wherein the first set of features is represented by a first feature vector;

extracting a second set of features from the second application data, wherein the second set of features indicates a second data pattern associated with the second application data, wherein the second set of features is represented by a second feature vector;

comparing each numerical value of the first feature vector with a counterpart numerical value of the second feature vector; and determining that at least a threshold number of numerical values of the first feature vector correspond to counterpart numerical values of the second feature vector.

18. The non-transitory computer-readable medium of claim 15, wherein the instructions further cause the processor to:

determine a set of failure characteristics associated with the anomalous portion of the second application data, wherein determining the set of failure characteristics comprises:

accessing a log file associated with the first operation being performed on the first application data; and identifying an error message in the log file; and based at least in part upon the set of failure characteristics, determine a root cause of the anomalous portion of the second application data.

19. The non-transitory computer-readable medium of claim 18, wherein the root cause of the anomalous portion of the second application data comprises at least one of:

insufficient computational resources being allocated to the first operation being performed on the first application data;

insufficient network resources being allocated to a transfer of first application data from the source device; or a configuration file associated with the first application data being incompatible with the first operation.

20. The non-transitory computer-readable medium of claim 19, wherein the instructions further cause the processor to:

assign a severity level to the second application data based at least in part upon the determined criticality level of the anomalous portion of the second application data; and select a solution instruction from among the first solution instruction and one or more alternative solution instructions, wherein the one or more alternative solution instructions are associated with a rule that indicates the one or more alternative solution instructions are associated with the anomalous portion.

* * * * *